United States Patent [19]

Miura

[11] Patent Number: 5,081,861

[45] Date of Patent: Jan. 21, 1992

[54] RESIN DIE FOR SHEET METAL PRESSING AND METHOD FOR PRODUCING SAME

[76] Inventor: Hiroshi Miura, 8-17-208, Hanamigawa, Chiba-Shi, Chiba-Ken 281, Japan

[21] Appl. No.: 474,097

[22] PCT Filed: Dec. 25, 1987

[86] PCT No.: PCT/JP87/01029

§ 371 Date: Apr. 16, 1990

§ 102(e) Date: Apr. 16, 1990

[87] PCT Pub. No.: WO89/03731

PCT Pub. Date: May 5, 1989

[30] Foreign Application Priority Data

Oct. 23, 1987 [JP] Japan ................................ 62-266535

[51] Int. Cl.$^5$ ............................................. B21D 37/01
[52] U.S. Cl. ....................................... 72/462; 76/107.1
[58] Field of Search .......... 72/462; 76/107.1, DIG. 6, 76/DIG. 7; 264/279.1

[56] References Cited

U.S. PATENT DOCUMENTS 3,041,131  6/1962  Juras et al. ........................ 76/107.1
4,919,876  4/1990  Savage et al. ..................... 264/279.1

Primary Examiner—Lowell A. Larson
Attorney, Agent, or Firm—Rothwell, Figg, Ernst & Kurz

[57] ABSTRACT

The present invention resides in a resin die for sheet metal pressing and a method for producing same, in which a thermosetting resin-impregnated vortex-like multi-layer body formed of reinforcing fibers is pushed against a die shoulder and/or punch shoulder forming portion(s) of a matrix to obtain a deformed vortex-like multi-layer body, following by curing of the resin, to form a reinforcing member (5), thereby reinforcing the shoulder portion(s) of the resin die.

50% or more of the reinforcing fibers are arranged substantially in parallel with the direction in which a local load is imposed on a die shoulder portion and/or a punch shoulder portion during sheet metal pressing, and therefore the resistance to load of the resin die shoulder portion(s) can be enhanced. Besides, the resin die is superior in durability because the reinforcing member is in the shape of a deformed vortex-like multi-layer which prevents a load from acting as an interlaminar shear force.

18 Claims, 6 Drawing Sheets

RESIN DIE FOR SHEET METAL PRESSING AND METHOD FOR PRODUCING SAME

FIELD OF ART

The present invention relates to a resin die for sheet metal pressing and a method for producing same. Particularly, the present invention is concerned with a resin die for sheet metal pressing and a method for producing same in which a reinforcing member is incorporated in the die and punch shoulder portions of the sheet metal pressing resin die to ensure sufficient strength and durability, the said reinforcing member being obtained by impregnating a deformed vortex-like multi-layer body formed of reinforcing fibers with a thermosetting resin followed by curing.

BACKGROUND ART

Conventional practical resin dies for sheet metal pressing have been manufactured by a lamination method or a metal core method. First, the lamination method will be outlined below with reference to FIG. 14.

In FIG. 14, the numeral 20 denotes a core box. Within the core box 20 there is fixed a model 21 formed of wood, synthetic wood, gypsum, or the like. A releasing agent is applied to the inner surface of the core box 20 and the surface of the model 21, and a resin for the surface layer is applied onto the releasing agent to form a surface resin layer 22. When the surface layer resin was semi-cured, resin-impregnated fibers are stuck thereon to form a reinforcing layer 23. At this time, in conformity with local shapes of the die various resin-impregnated fibers are used properly so as to be compatible with such local shapes. For example, a woven cloth is used for a flat portion, or short fibers are used or short-cut woven cloth pieces are joined together for a curved portion. In a corner or a small curve, roving pieces cut in an appropriate length are embedded.

The space inside the reinforcing layer 23 is filled with a sand or short fibers-incorporated resin. Upon curing of that resin, there is obtained a sand core 24. Then, a levelling resin is applied onto the whole, which is then covered with a horizontal plate 25, allowing the resin to be cured. As a result, a levelling layer 26 is formed.

After curing of all the resins, the cured resinous body is taken out from the core box 20 to afford a finished resin die, in which the surface resin layer 22 is formed outside, the reinforcing layer 23 using a fiber-reinforced resin is formed inside the surface resin layer 22, the sand core 24 is formed inside the reinforcing layer 23, and the levelling layer 26 is formed as an upper surface layer.

The metal core method, which has also been used practically in addition to the lamination method, will now be outlined with reference to FIG. 15. A core 27 made by metal casting and having an external form smaller by 10 to 20 mm than the size of a die is prepared. In this case, an inlet 28 is formed in the core 27. A model 21 is fixed within the core box 20 and a releasing agent is applied to the model. Then, a small cured piece of a casting resin having a thickness corresponding to the thickness of the casting resin is disposed as a spacer, on which is then placed the core 27. The casting resin is poured from the inlet 28 to fill the space between the core 27 and the core box 20 and the space between the core 27 and the model 21. After the resin was cured and became integral with the core 27, the integral body is taken out to find that a resin layer 29 is formed on the outer periphery except the upper surface. By cutting and thereby levelling the upper surface there is obtained a resin die having desired shape and size.

In this resin die, the resin layer 29, which has a thickness of 10 to 20 mm, is formed on the outer periphery except the upper surface, and the metallic core 27 is present inside the resin layer 29. The resin layer 29 and the core 27 are bonded together as an integral body by virtue of a bonding force created at the time of curing of the resin The sheet metal pressing work is based on a forming method wherein a blank holding pressure is applied to a blank such as a cold-rolled steel sheet inserted between the die surface and the blank holding surface, and in this state a punch is press-fitted in the blank to effect a plastic deformation of the blank. At the time of press-fitting of the punch, the blank undergoes a tensile deformation and a flexural deformation between the shoulder portion of the die and that of the punch, and is deformed plastically by those deforming forces. Consequently, large local loads are imposed on these shoulder portions in a forming operation. Therefore, a die for sheet metal pressing is required to have high load-resistant strength and abrasion resistance particularly at the die and punch shoulder portions. It is not too much to say that the durability of a die depends on the strength and abrasion resistance of its shoulder portion.

In the resin die produced by the foregoing lamination method, the reinforcing layer 23 for ensuring strength is formed inside the surface resin layer 22. In forming the reinforcing layer 23 there is used a woven cloth as a reinforcing fiber. However, the shape of the woven cloth incapable of expanding and contracting cannot be made coincident exactly with the curved shape of the die and punch shoulder portions which are curved three-dimensionally. Therefore, a woven cloth is not employable for the shoulder portions, and instead short fibers have been used, or small cut cloth pieces have been joined together in use. Or roving pieces cut in an appropriate length have been used in an embedded fashion.

In the case of using short fibers, it has heretofore been impossible to obtain a sufficient strength because the fibers to function as a reinforcing material are too short. Also in the case where cut cloth pieces are laminated while being joined together, it is impossible to expect a sufficient improvement of strength because of too short fibers; besides, a shear force is developed between laminated layers upon exertion of a load on the reinforcing layer, which may cause deterioration of the strength. Further, in the case of using roving pieces, it has heretofore been quite impossible to expect a transverse strength relative to the arranged direction of the fibers. In all of the above cases, because of a too low strength of the shoulder portion, the shoulder portion undergoes a plastic deformation and the wear thereof is amplified as the press work is repeated, and finally such resin dies became unemployable. Therefore, such conventional resin dies have been employable only in a small-volume forming operation such as trial manufacture.

On the other hand, in the case of a resin die manufactured by the metal core method, a resin which incorporates therein 20-25 vol % of a fine metallic powder is cast onto the surface of the metallic core 27 at a thickness of 10-20 mm to form the resin layer 29. The core 27 as a reinforcing member is strong because it is metallic. However, according to the structure of this resin die, the resin layer 29 is bonded to the outer periphery of the metallic core 27. Thus, it is a bonded body obtained by bonding different materials together, one being a metallic lump and the other a resinous lump. That is, both are greatly different in thermal expansion coefficient, heat storage property and rigidity, so with repetition of a load-acting cycle, the differences in physical properties and behaviors between the two materials gradually come up to the surface and finally cause delamination of the resin layer 29 at the shoulder portions. Further, since the shoulder portion is curved, part of the load acts as a component force in a direction of delaminating the resin layer 29. This also accelerates the delamination. Once the resin layer 29 is delaminated, the die will undergo a plastic deformation and the wear thereof will proceed acceleratively to an unemployable extent.

Accordingly, it is the object of the present invention to overcome the above-mentioned problems of the conventional resin dies and provide a resin die for sheet metal pressing having improved strength and durability of die and punch shoulder portions, as well as a method for producing such die.

DISCLOSURE OF THE INVENTION

In the resin die for sheet metal pressing according to the present invention, a reinforcing member is incorporated in the die shoulder portion and/or punch shoulder portion on which is exerted a local load, the said reinforcing member being obtained by impregnating a deformed vortex-like multi-layer body formed of reinforcing fibers with a thermosetting resin followed by curing.

In the method for producing a sheet metal pressing resin die according to the present invention, reinforcing fibers which have been wound in a vortex form and impregnated with a thermosetting resin are pushed toward the position corresponding to the die or punch shoulder portion of a matrix and are deformed and cured, whereby a reinforcing member constituted by a thermosetting resin-impregnated cured product of a deformed vortex-like multi-layer body formed of the reinforcing fibers is formed in the die shoulder portion and/or punch shoulder portion on which is exerted a local load.

For example, the resin die for sheet metal pressing in question is formed in the following manner. First, a releasing agent is applied to the inner peripheral surface of a matrix, then a thermosetting resin having incorporated therein a hard, pressure-resistant, fine powder and a fine powder of a solid lubricant is applied to the thus-coated inner peripheral surface of the matrix. The former fine powder is used for imparting pressure-and abrasion-resistance to the matrix inner surface, while the latter fine powder is for abrasion resistance. Upon curing of the thermosetting resin, there is formed a surface resin layer. While the surface resin layer is still in a highly viscous state, a reinforcing member is formed in the foregoing manner inside the surface resin layer and in positions corresponding to the die and punch shoulder portions. In the sheet metal pressing resin die thus produced, the surface resin layer is superior in both pressure resistance and abrasion resistance.

In a further aspect of the present invention there is provided a resin die for sheet metal pressing, in which a reinforcing member constituted by a thermosetting resin-impregnated cured product of a deformed vortex-like multi-layer body formed of reinforcing fibers is formed in the die and punch shoulder portions, and a knitted cloth layer constituted by a thermosetting resin-impregnated cured product of a knitted cloth of reinforcing fibers of which at least the fibers positioned in the shoulder portions are in a completely stretched state is formed outside the said reinforcing member in a shape which follows the surface shape of the die or punch used.

In this sheet metal pressing resin die, the knitted cloth layer constituted by a thermosetting resin-impregnated cured product of a knitted cloth of reinforcing fibers is formed outside the reinforcing member in a shape which follows the surface shape of the die. The fibers of the above knitted cloth of reinforcing fibers are in a completely stretched state a least at the portions thereof positioned in the shoulder portions. Where fibers in a stretched-up state are impregnated with a thermosetting resin and cured, there is obtained a high strength.

Such reinforcing member and knitted cloth layer are formed as follows for example. First, a woven cloth of reinforcing fibers, a non-woven cloth of reinforcing fibers containing unidirectionally strained and arranged reinforcing fibers, or a reinforcing filament wound up in a vortex form and impregnated with a thermosetting resin, is pushed toward the position corresponding to the die or punch shoulder portion of a matrix and thereby deformed into a deformed vortex shape. Further, a thermosetting resin-impregnated woven cloth or a thermosetting resin-impregnated non-woven cloth containing reinforcing fibers strained and arranged in one direction, which is for forming a reinforcing layer, is stuck on the inside of the said vortex. By integral curing there is formed a reinforcing layer which is integral with the reinforcing member. And the integral body is taken out. Before this removal there may be formed a sand core or the like in the interior of the reinforcing layer. Next, a layer is formed along the matrix using a knitted cloth of reinforcing fibers impregnated with a thermosetting resin. While the fibers of this knitted cloth are stretched, the reinforcing layer integral with the reinforcing member is inserted into the interior of the said layer formed along the matrix so that at least the fibers positioned in the shoulder portions are brought into a completely stretched state. Then, both are cured integrally to form a knitted cloth layer outside the reinforcing member and the reinforcing layer.

The reinforcing fibers used in the shoulder portion of the resin die according to the present invention have a very high mechanical strength against the longitudinal direction of the fibers and the elongation thereof is extremely small. A fiber-reinforced resin composite comprising such reinforcing fibers and a resin having a relatively low mechanical strength is strengthened in the longitudinal direction of the fibers even to an extent superior to steel, but is not so strengthened in the other directions. And the strength thereof depends on the form and content of the fibers in the composite. In other words, in order to obtain a highly strengthened fiber-reinforced resin product, it is necessary to increase the content of the reinforcing fibers and some consideration is needed for bonding the surfaces of all the fibers strongly to the resin. Further consideration is needed so that the fibers in the composite take the following form.

① The fibers should be long fibers capable of dispersing a local load throughout the overall length of each fiber.

② A loading direction and the direction of the fibers should be parallel to each other.

③ The reinforcing fibers should be laminated together to ensure a structure in which a load does not act as an inter-layer shear force to which the strengthening effect of the reinforcing fibers scarcely contributes.

④ The fibers should be in a rectilinearly strained state without looseness.

In the sheet metal pressing resin die of the present invention, the reinforcing fibers for strengthening the shoulder portion are used in the form of a woven cloth, or a non-woven cloth in which the reinforcing fibers are strained and arranged in one direction, or filament. In this case, the fiber density per volume is high as compared with short fibers and mat, and hence it is possible to increase the content of the fibers in the fiber reinforced resin. The adhesion between the fiber surfaces and the resin can be improved by treating, for example, the woven cloth with a surface treating agent having high affinity for a thermosetting resin for impregnation and then impregnating the so-treated cloth with the thermosetting resin. Further, the foregoing conditions relating to preferred forms of the fibers can be satisfied as follows.

Sheet metal pressing is a forming work for a blank such as a cold-rolled steel sheet through vertical motions between a die and a punch. On the die shoulder portion is exerted a local load in the direction of a vertical section through the blank. The reinforcing fibers present in the shoulder portion of the resin die of the present invention are fibers which constitute a woven or non-woven cloth, or filament. The woven cloth is, for example, plain weave fabric, twill fabric, or satin, obtained by 90°-cross weaving of roving or yarn of long fibers strained rectilinearly. The non-woven cloth includes reinforcing fibers strained and arranged rectilinearly in one direction. As the non-woven cloth there also may be used a non-woven cloth obtained by straining and arranging reinforcing fibers in one direction and then allowing a large number of reinforcing fibers to cross the thus-strained reinforcing fibers. Also, plural non-woven cloth containing reinforcing fibers strained and arranged in one direction may be lapped together so that the respective reinforcing fibers cross each other. These non-woven cloths may be used in the state of prepreg. Further, in the case of using a reinforcing filament, the filament is used in a vortexwise wound state by a melt winding method. In this case, if 10-20% of reinforcing fibers are disposed in the transverse direction, it is possible to cope with a component of force of load.

In the case of an ordinary planar shoulder die, winding is made in a vortex form in the direction of warp with respect to weft when woven cloth is used, while when non-woven cloth is used, winding is made vortexwise in the direction of reinforcing fibers strained in one direction. In the case of using a reinforcing filament, the filament is wound in a vortex form by a filament winding method for example and then a mandrel is removed. Before or after the vortex winding, the fibers or filaments are impregnated with a thermosetting resin. When the filament winding method is adopted, the filament is usually impregnated with a thermosetting resin and thereafter wound in a vortex form. This is also true of prepreg. The thermosetting resin-impregnated vortex is then pushed and crushed strongly toward the position corresponding to a shoulder portion of a matrix. When the resin is cured, there is obtained a deformed vortex-like reinforcing member. The warps of this reinforcing member are arranged in parallel with the direction of load which is applied in the direction of a vertical section of the shoulder portion. Therefore in an ordinary woven or non-woven cloth using warps and wefts in an equal quantity, the warps which occupies 50% of the total fiber quantity assume a form parallel to the loading direction. In the case of a woven or non-woven cloth comprising 70% warps and 30% wefts, the warps which occupy 70% assume a form parallel to the loading direction. In a filament vortex made by the filament winding method, the entire vortex filament is substantially parallel to the loading direction. Therefore, in the case where the reinforcing member is formed using such woven or non-woven cloth or vortex filament, the mechanical strength against a pressing load is further improved at the die shoulder portion. The strength of the shoulder portion can be adjusted by changing the number of vortex windings of the reinforcing member.

In the case of a die having a shoulder portion inclined with respect to a transverse section, it is possible to make the loading direction and the fiber direction parallel to each other by forming a vortex so that the warp direction of woven or non-woven cloth or the filament winding direction has a angle conforming to the angle of inclination. Further, in the case of a shoulder shape having complicated loading directions, plural sheets may be lapped together so that the respective loading directions and fiber directions are parallel to each other, followed by winding of the resulting integral body into a vortex form.

According to a further method employable in the invention, a deformed vortex-like multi-layer body is formed in the shoulder portion, using a woven cloth containing warps in a larger proportion, and after curing of resin, a woven cloth containing wefts in a larger proportion is stuck on the side face of the multi-layer body. According to another method also employable in the invention, a deformed vortex-like multi-layer body is formed in the shoulder portion, using a non-woven cloth of fibers strained in the longitudinal direction, and after curing of resin, a non-woven cloth of fibers strained in the transverse direction is stuck on the side face of the multi-layer body. According to a still further method employable in the invention, a deformed vortex-like multi-layer body is formed in the shoulder portion, using a winding of filament obtained by the filament winding method for example, and then a large number of filaments are stuck in the transverse direction on the side face of the multi-layer body. In these methods, woven and non-woven cloths and filament may be used in a suitable combination.

Next, there is calculated the strength of the resin die in which the reinforcing member is formed in a deformed vortex form in the shoulder portion so that the loading direction and the fiber direction are parallel to each other. This calculation was made on the basis of data relating to woven carbon fiber cloth—resin composites which data are described in "Non-metallic Materials Data Book," a foundation—Japanese Standards Association (Sept. 17, 1985), pp. 288-289.

According to the above data, an epoxy resin-impregnated cured product of a single layer containing 60 vol % of a plain weave carbon fiber fabric No. 6343 which consists of 50% warps and 50% wefts has a thickness of 0.19 mm as well as a tensile strength and a bending strength both in the warp direction of 58 kg/mm$^2$ and 78 kg/mm$^2$, respectively. Therefore, a reinforcing member of five vortex windings in this condition has ten laminate layers at its largest portion, and the thickness thereof is 1.9 mm. And according to a simple calculation, the tensile strength and bending strength per millimeter of the shoulder portion are 110 kg and 148 kg, respectively.

On the other hand, regarding cold-rolled steel sheets as workpieces, it is defined by JIS that the tensile strength of SPCD for deep drawing should be not lower than 28 kg/mm$^2$. Taking into account that a plastic deformation of a steel sheet occurs in a condition lower than the tensile strength, it is considered that a steel sheet of 1 mm thick SPCD can be subjected to forming under a load less than 28 kg per millimeter of the shoulder portion of the die. It follows that it is sufficient if a reinforcing member formed by using a 1.9 mm thick woven carbon fiber cloth is provided in the shoulder portion. Even when the fiber direction scatters at the time of formation of the shoulder portion, or even in the case of a shoulder shape having complicated loading directions, it is possible to obtain a strength of a high safety factor by adjusting the number of vortex windings.

According to an example of a mixed weaving found in the foregoing data, an epoxy resin-impregnated cured product containing 60 vol % of No. 6103 (a product of Toray Industries Inc.) which is a four-heald satin fabric comprising 82% of carbon fiber warps and 18% carbon fiber wefts both in weight ratio, proved to have the following tensile strength, etc. in the warp direction:

Tensile strength 140 kg/mm$^2$
Tensile modulus 10.4 t/mm$^2$
Bending strength 140 kg/mm$^2$
Bending modulus 9.4 g/mm$^2$
Inter-layer shear strength: 7.8 kg/mm$^2$ A cured unidirectional epoxy resin prepreg using in 65% volume ratio of a carbon fiber (a product of Tobray Industries Inc.) was found to have the following tensile strengths, etc. in the fiber direction:

Tensile strength 150 kg/mm$^2$
Tensile modulus 24 t/mm$^2$
Bending strength 140 kg/mm$^2$
Bending modulus 20 t/mm$^2$
Inter-layer shear strength 8 kg/mm$^2$ Thus, a resin die having a reinforcing member formed in the shoulder portion thereof by using the above mixed weave cloth or unidirectional non-woven cloth can fully withstand a load applied when pressing a steel sheet. Particularly, the unidirectional non-woven cloth is very high in elastic modulus, so the use thereof affords a high buckling strength.

Where a multi-layer body is formed using reinforcing fibers, then impregnated with resin and cured, there easily occurs a problem related to an inter-layer shear force. The problem of an inter-layer shear force is concerned with the strength between layers. The reinforcing fibers scarcely contributes to the improvement of the inter-layer strength. In the sheet metal pressing resin die of the present invention, the fibrous laminate which constitutes the reinforcing member formed in the shoulder portion is in a deformed vortex form which follows the curve of the shoulder portion, so the force in the direction acting as an inter-layer shear force is very small morphologically. And at an end portion of the deformed vortex the fibers are folded back continuously without seam. Therefore, even if an inter-layer shear force is developed and, for example, a certain layer tends to slide between it and an adjacent layer, since the fibers which constitute the said certain layer also constitute the other layer folded back and adjacent thereto, the other layer induces a pulling force in the direction opposite to the sliding direction. That is, the inter-layer shear force is absorbed by the pulling force which is very strong, so there will never arise the problem related to the inter-layer shear force. As is apparent also from the above, it is desirable that as large a proportion as possible of the reinforcing fibers which constitute the reinforcing member be in parallel with the direction of load acting on the shoulder portion. It is desirable that at least 50% thereof be in parallel with the loading direction and that they be long fibers. If there is used a single seamless sheet of woven or non-woven cloth or filament winding to form a deformed vortex-like multilayer body, it is possible to enhance the strength. Further, the buckling strength is also enhanced because the reinforcing member has an arch structure. In the case of a shoulder shape having complicated loading directions, it is better to use plural sheets in a lapped state in different fiber directions. This is as noted previously. As examples of the reinforcing fibers which constitute the reinforcing member, there are mentioned various fibers, including carbon, alumina, boron, silicon carbide, glass, aramid, ultra-high molecular weight polyethylene, vinylon, polyester and stainless steel fibers. Fibers of the same kinds, as well as mixed woven or non-woven cloths and mixed filaments using fibers of different kinds, are employable. Preferred examples of fibers for enhancing the buckling strength of the shoulder portions and thereby improving the durability include carbon, alumina, boron, silicon carbide, aramid and stainless steel fibers which are all high in elastic modulus.

As the thermosetting resin to be impregnated in the reinforcing fibers which constitute the reinforcing member it is desirable to use a thermosetting resin which is liquid at room temperature or is liquefied by heating at a temperature not higher than 100° C. or permits the removal of a solvent. Examples of such thermosetting resin include epoxy resins, polyimide resins, unsaturated polyester resins, vinyl ester resins, and polyurethane resins.

As the reinforcing fibers used as the material of the knitted cloth which forms the knitted cloth layer it is desirable to use reinforcing fibers having abrasion resistance. Examples are carbon, aramid, ultra-high molecular weight polyethylene, titanic acid, vinylon, polyester and nylon fibers.

As the thermosetting resin to be impregnated in the knitted cloth layer it is desirable to use a resin which is liquid at room temperature or is liquefied by heating at a temperature not higher than 100° C. or permits the removal of a solvent.

Under the above construction, the sheet metal pressing resin die of the present invention and a sheet metal pressing resin die produced by the method of the present invention possess both strength and durability high enough for use as practical dies. And both still retains the advantage of the resin dies at large that they can be manufactured inexpensively and rapidly. The manufacture is easy because neither an advanced technique nor a special equipment is needed. Therefore, they will fully meet the demand for small and medium lot productions which demand is increasing with diversifying of the commodity market.

BEST FORM FOR PRACTISING THE INVENTION

The present invention will be described in more detail hereinunder with reference to the accompanying drawings.

Figure 1:
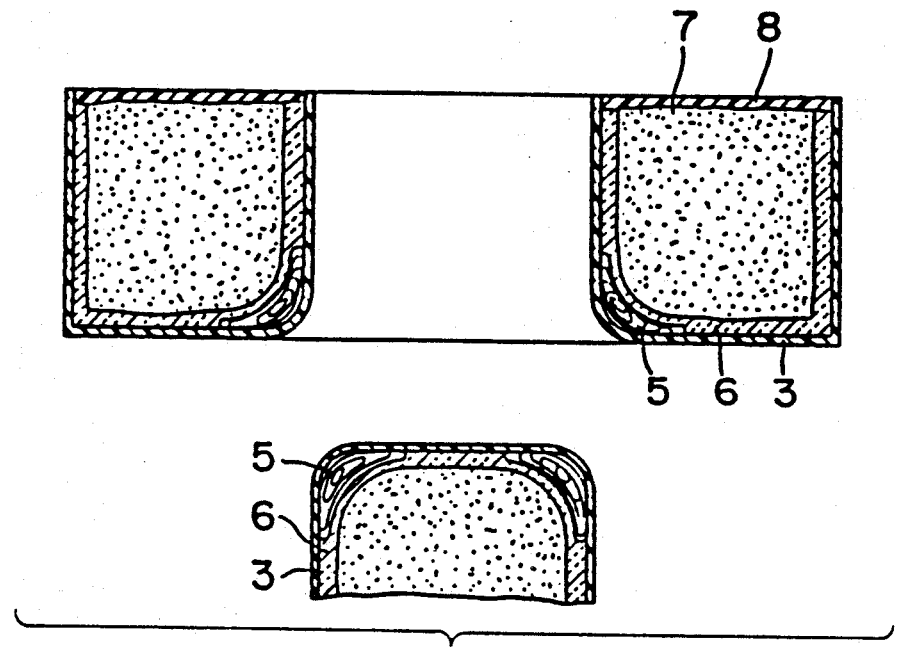
FIGS. 1, 2, 4 and 5 are vertical sectional views showing a first embodiment of the present invention.

FIGS. 1 to 5 illustrate a first embodiment of the present invention. FIG. 1 is a vertical sectional view showing the whole of a die and a head portion of a punch. The following description is now provided about a method for producing the die with reference to FIGS. 2 to 5.

Figure 2:
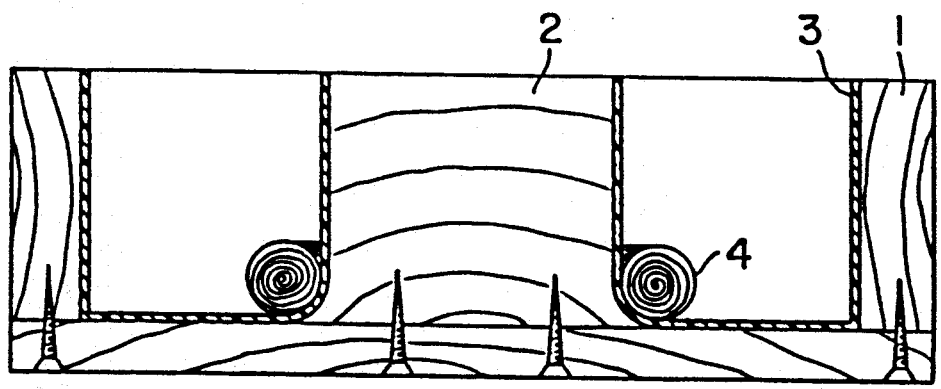

First, as shown in FIG. 2, a core box 1 is provided and a model 2 is fixed within the core box 1. After a releasing agent is applied to the peripheral surface of the space surrounded by the core box 1 and the model 2, an epoxy resin which incorporates therein a rigid fine powder having pressure resistance and a fine powder of solid lubricant is applied to the thus-coated peripheral surface. The former fine powder is used for ensuring pressure resistance and abrasion resistance and the latter fine powder is used for ensuring abrasion resistance. When the epoxy resin is cured, there is formed a surface resin layer 3.

Figure 3:
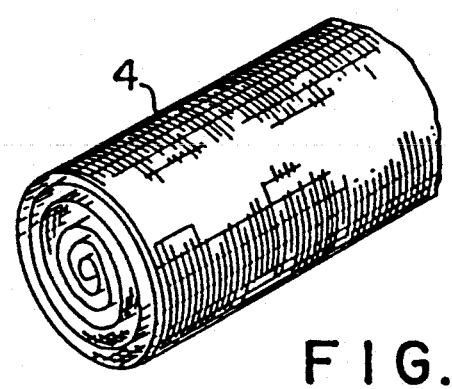
FIG. 3 is a perspective view of a vortex-like woven cloth used in the first embodiment.
Figure 4:
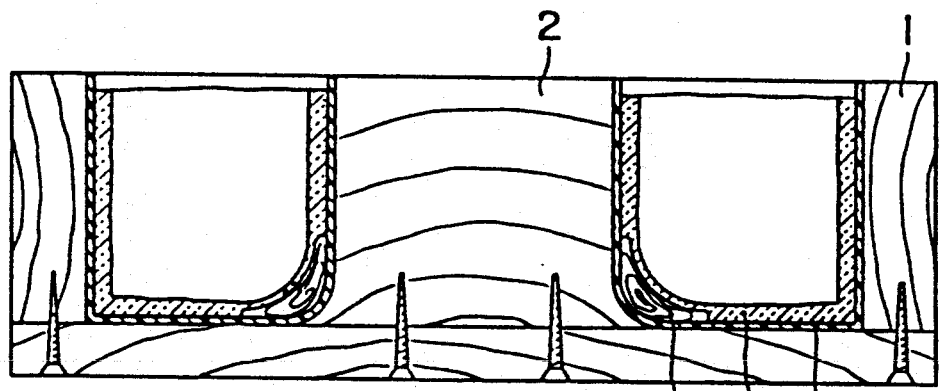

Next, there is provided such a vortex-like woven cloth 4 as shown in FIG. 3. As the woven cloth there is used a four-heald satin cloth (warp 80%, weft 20%) of aramid fibers, and the cloth was wound in a vortex form in the warp direction so that the warps overlapped each other in a vortex form. For imparting pressure resistance to the vortex-like woven cloth 4, this cloth is impregnated with an epoxy resin with a rigid fine powder impregnated therein. Then, while the surface resin layer 3 is still in a highly viscous state, the resin-impregnated vortex-like woven cloth 4 is wound round the outer periphery of the lower end of the model 2, as shown in FIG. 2. The vortex-like woven cloth 4 is pushed strongly against the connection of the model 2 and the core box 1 and thereabouts and is crushed throughout the entire periphery, resulting in that there is obtained a deformed vortex shape in a crescent which is a crushed vortex shape (FIG. 4). Upon curing of the impregnated resin there is in a crescent formed a reinforcing member 5 which is in the form of the deformed vortex in a crescent. But prior to curing of the resin, as shown in FIG. 4, a woven cloth of vinyl fibers impregnated with an epoxy resin is pushed and laminated to the inner surfaces of the reinforcing member 5 and the surface resin layer 3, and onto this impregnated woven cloth is further pushed and laminated a woven cloth of aramid fibers impregnated with an epoxy resin. Upon curing of the resin there is formed a reinforcing layer 6 having a thickness of about 5 mm.

Figure 5:
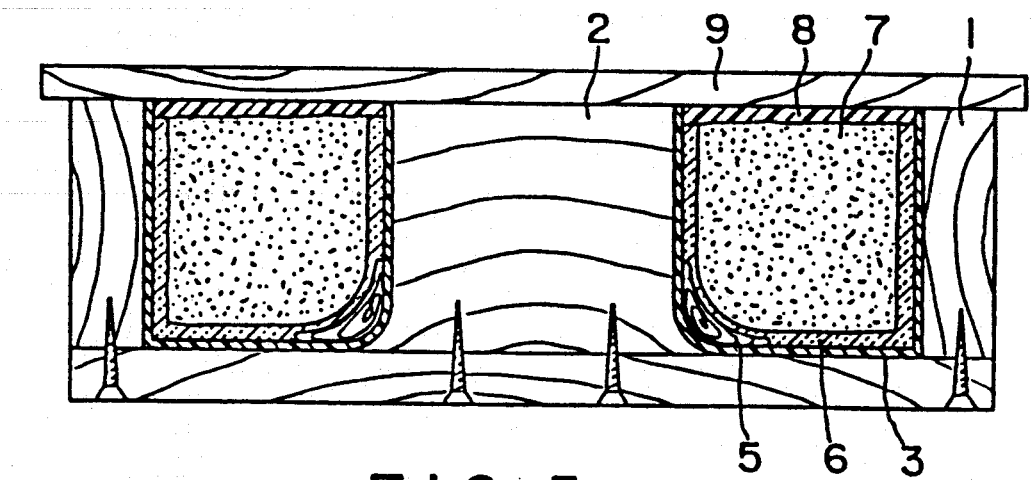

Next, a kneaded mixture consisting of about 90 wt % of silica sand, about 0.1 wt % of aramid fibers and a little less than 10 wt % of an epoxy resin is charged inside the reinforcing layer 6 under pressure. When the resin is cured, there is formed a sand core 7. Finally, after the application of an epoxy resin for forming a levelling layer 8 as an upper surface, the top is covered with a horizontal plate 9, which is then pressed strongly. As a result, there is obtained such a state as shown in FIG. 5.

On removal after curing of the resin there is obtained the die illustrated in FIG. 1. As is apparent from the foregoing manufacturing method, this die has the following structure. The outer periphery except the upper surface is formed with the surface resin layer 3, and the reinforcing member 5, which is in a deformed vortex shape in a crescent, is formed at the shoulder portion. Further, inside the reinforcing member 5 and the surface resin layer 3 there is formed the reinforcing layer 6, and inside the reinforcing layer 6 there is formed the sand core 7, with the levelling layer 8 being formed as the upper surface.

The punch shown in FIG. 1 has also been produced in the same manner as above and it has a similar internal structure.

In the die and punch produced as above, the surface resin layer 3 is formed as a surface layer using an epoxy resin. In this epoxy resin there are incorporated a rigid fine powder having resistance to pressure and to abrasion and a fine powder of a solid lubricant. Therefore, the surface resin layer 3 is superior in pressure resistance and abrasion resistance. Moreover, at the shoulder portion on which is exerted a load there is formed the reinforcing member 5 having a shape which follows the shoulder portion. As to the reinforcing member 5, a four-heald satin cloth of aramid fibers wound in a vortex shape in the warp direction and impregnated with an epoxy resin is crushed into a deformed vortex shape in a crescent which follows the shoulder shape, and the resin is cured, whereby the reinforcing member is formed. Since a rigid fine powder is incorporated in this epoxy resin, pressure resistance is ensured.

During press forming, a local load is imposed on the shoulder portion of the die. In this die, the warps of the woven cloth which constitutes the reinforcing member 5 are wound in a deformed vortex shape in a crescent in parallel with the direction in which the local load is exerted.

Therefore, the local load scarcely acts as an inter-layer shear force. Besides, at an end portion of the deformed vortex the fibers are folded back continuously without seam. So even if an inter-layer shear force is developed and, for example, a certain layer tends to slide between it and another layer adjacent thereto, since the fibers constituting the layer which tends to slide also constitute the adjacent layer folded back, there is created a pulling force in the direction opposite to the direction in which the another layer tends to slide. That is, the inter-layer shear force is absorbed by the tension, so the problem related to the inter-layer shear force will never arise.

Since the warps of the woven cloth which constitutes the reinforcing member 5 are parallel to the loading direction, an extremely high reinforcing effect is attained by the warps, thus making the reinforcing member 5 stronger. This also has a good effect on the abrasion resistance of the portion of the surface resin layer 3 located at the shoulder portion.

Further, the reinforcing layer 6 is formed inside the surface resin layer 3 and the reinforcing member 5. The reinforcing layer 6 is formed by impregnating a woven cloth of vinylon or aramid fibers with an epoxy resin followed by curing of the resin. Vinylon and aramid fibers themselves possess mechanical strength and abrasion resistance, so a combination thereof with an epoxy resin causes still higher mechanical strength and abrasion resistance to be exhibited. Thus, the reinforcing layer 6 is extremely strong and also serves to protect the surface resin layer 3.

Figure 6:
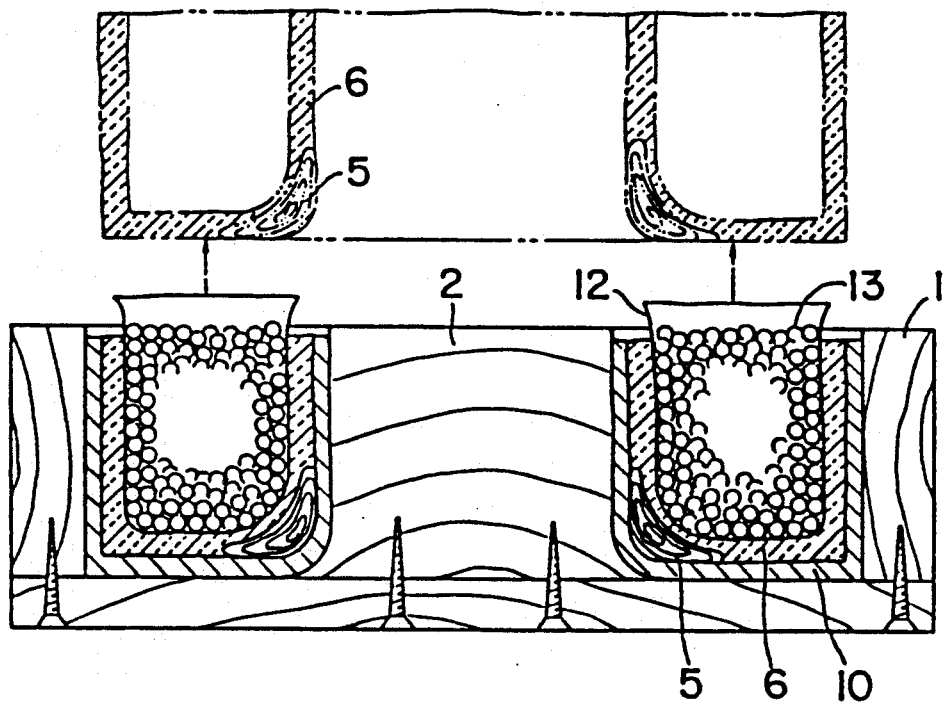
FIGS. 6, 7, 8 and 9 are vertical sectional views showing a second embodiment of the present invention.

FIGS. 6 to 9 illustrate a second embodiment of the present invention. First, a sheet wax 10 is stuck on the outer periphery of a model 2 and the inner surface of a core box 1. The sheet wax 10 is to be removed in an intermediate stage of manufacture and the thickness thereof corresponds to the total thickness of later-formed surface resin layer 3 and knitted cloth layer 11. Inside the sheet wax 10 there is formed a reinforcing member 5 in the following manner. First, a mixed four-heald satin cloth comprising 82 wt % of carbon fiber warps and 18 wt % of glass fiber wefts is wound in such a vortex shape as shown in FIG. 3 and then impregnated with an epoxy resin. The thus resin-impregnated vortex-like cloth is wound round the inside corner present in the position corresponding to the shoulder portion of the die and pushed strongly against the said inside corner and thereby crushed in a crescent, whereby there is obtained a deformed vortex shape wherein the thickness of a central lamination part is about 4 mm. When the resin is cured, the reinforcing member 5 is obtained. But before curing of the resin, a woven cloth of carbon fibers or short fibers impregnated with an epoxy resin is pushed under pressure against the reinforcing member 5 or the sheet wax 10 to form a layer having a thickness of about 5 mm. Upon curing of this resin there is obtained a reinforcing layer 6. But prior to curing of the resin, a releasing film such as polyethylene film for example is stuck on the inner surface of the reinforcing layer 6, and thereafter, for example, balls of a high specific gravity such as lead or type metals balls are charged inside the releasing film 12 to constitute a weight 13. In this way the shape is retained until curing of the resin (FIG. 6). In the case where the weight 13 is weak, a cover plate is used and clamped strongly with a squill vice or the like. When the resin is cured, the weight 13 is taken out and the releasing film 12 is also taken out. Then, the reinforcing layer 6 which has been cured integrally with the reinforcing member 5 is taken out and the sheet wax 10 is peeled off. The surface and the back of the reinforcing layer 6 are roughened by sand blast for example to improve their adhesion.

Figure 7:
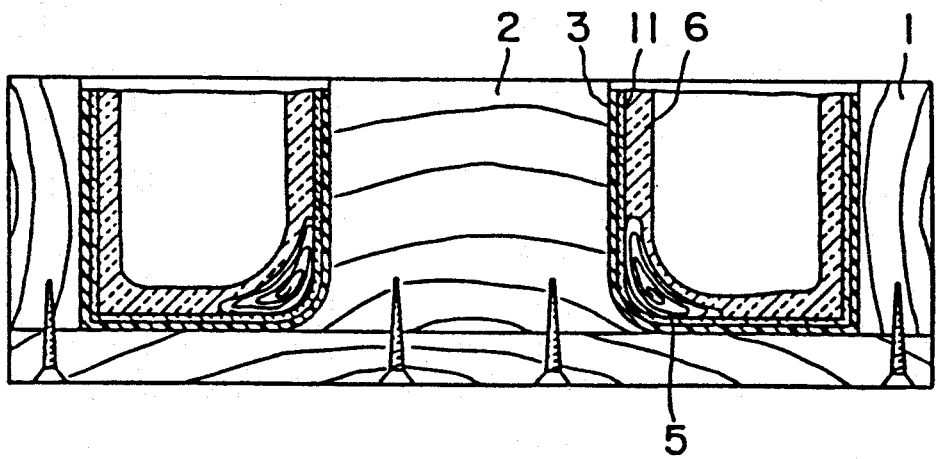
Figure 8:
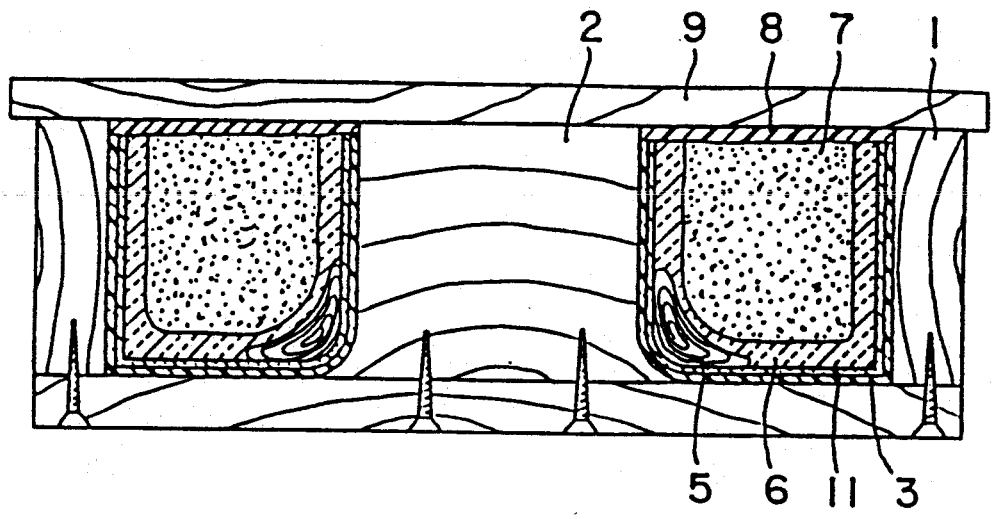

Next, the interior of the core box 1 now empty is cleaned and a releasing agent is applied thereto. Then, as shown in FIG. 7, an epoxy resin for forming a surface resin layer 3 is applied to the inner peripheral surface. In this resin there are incorporated a rigid fine powder having resistance to pressure and to abrasion and a fine powder of solid lubricant, whereby it is intended to ensure pressure resistance and abrasion resistance. Next, a knitted cloth of vinylon fibers impregnated with an epoxy resin for forming a knitted cloth layer 11 is stuck on the surface resin layer. This epoxy resin incorporates therein a rigid fine powder having pressure resistance for providing pressure resistance. Then, an epoxy resin is applied to the outer periphery of the previously-formed integral body of the reinforcing member 5 and the reinforcing layer 6, and thereafter this integral body is pushed in the knitted cloth so that the fibers of the knitted cloth are stretched up as far as possible. In this case, the integral body is pushed toward the surface resin layer 3 while adjusting so that the fibers assume a completely stretched state at least in the position corresponding to the shoulder portion. When the pushing-in of the reinforcing layer 6 is over, there is obtained the state shown in FIG. 7.

Then, an epoxy resin for bonding is applied to the inner surface of the reinforcing layer 6. Thereafter, for forming a sand core 7, a kneaded mixture consisting of about 90 wt % silica sand, about 0.1 wt % short glass fibers and a little less than 10 wt % of an epoxy resin is charged inside the reinforcing layer 6 under pressure. Thereafter, an epoxy resin for forming a levelling layer 8 as an upper surface layer is applied, which layer is then covered with a horizontal plate 9. The horizontal plate 9 is pressed strongly, whereby there is obtained the state shown in FIG. 8.

Figure 9:
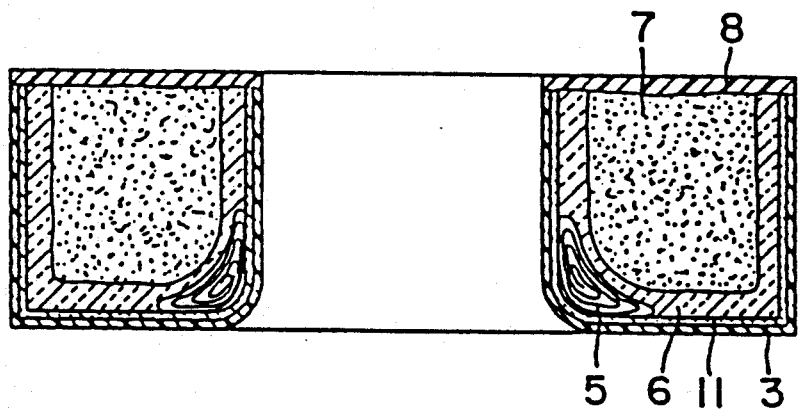

On removal after curing of the resin, there is obtained the die shown in FIG. 9. A punch which is a counterpart of the die can also be produced in the same manner as above. The die thus obtained is superior in durability to the die of the first embodiment and possesses the following features.

The function of the surface resin layer 3 is as already referred to in the first embodiment. In the second embodiment, a knitted cloth of vinylon fibers impregnated with an epoxy resin is rendered integral under pressure with the surface resin layer 3 of an epoxy resin so that the fibers are completely stretched at least in the position corresponding to the shoulder portion, to form the knitted layer 11. In the epoxy resin of the surface resin layer 3 are incorporated a rigid fine powder having pressure- and abrasion-resistance and a fine powder of a solid lubricant, thereby ensuring resistance to pressure and to abrasion. On the other hand, in the epoxy resin of the knitted layer 11 there is incorporated a fine powder which is rigid and resistant to pressure, thereby ensuring pressure resistance. Besides, the vinylon fibers themselves possess mechanical strength and abrasion resistance, and the knitted cloth layer 11 constituted by a knitted cloth or the like of such vinylon fibers is integral with the surface resin layer 3 in a cut-in form with respect to the latter, so the mechanical strength and abrasion resistance of the surface resin layer 3 are enhanced. The reason why a knitted cloth is used is that the constituent fibers well expand and contract and so are highly compatible with the shape of the shoulder portion, etc.

The manufacturing method for the resin die of the second embodiment is more complicated than that of the first embodiment because of an additional step of forming the reinforcing layer 6 in advance and still an additional step of forming the knitted cloth layer 11 while stretching the fibers. However, the addition of these steps results in enhanced mechanical strength of the surface layer and permits the prevention of abrasive deformations caused by plastic deformations. Thus, the durability of the die is greatly improved.

The manufacturing procedure in the second embodiment may be changed as follows. While the reinforcing layer 6 integral with the reinforcing member 5 is formed, the sand core 7 is also formed inside the reinforcing layer 6, then these are once taken out and thereafter on their outer periphery there are formed the surface resin layer 3 and the knitted cloth layer 11.

Without using the sheet wax 10, there may be provided another pair of core box 1 and model 2 smaller in the inner surface shape correspondingly to the thickness of the sheet wax 10, and using these two core box-model pairs, the production may proceed through the same process.

Figure 10:
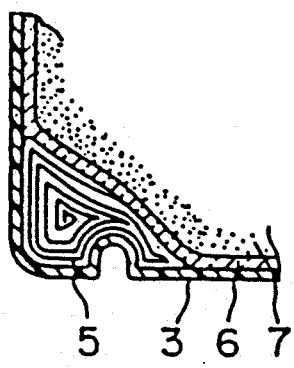
FIGS. 10 and 11 are vertical sectional views showing modifications of a principal portion of the first embodiment.
Figure 11:
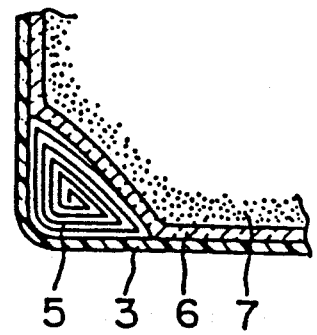

Although in the above embodiments the deformed multi-layer vortex of the reinforcing member 5 is crescent-shaped, but not always so, it may be changed into such shapes as shown in FIGS. 10 and 11, depending on conditions, including the structure of the shoulder portion.

Figure 12:
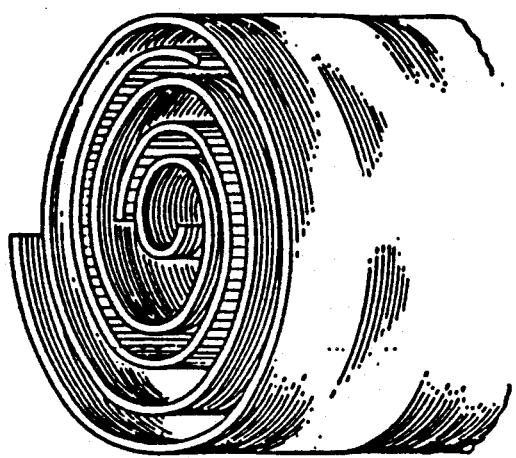
FIG. 12 is a perspective view showing an application example in the case of using a non-woven cloth for forming a deformed vortex-like multi-layer body.

Moreover, although in the above embodiments the deformed multi-layer vortex is formed using a woven cloth of reinforcing fibers, in the case of using a non-woven cloth of reinforcing fibers, the non-woven cloth may be wound, for example, as shown in FIG. 12. More specifically, a non-woven cloth of transversely strained reinforcing fibers is wound inside a non-woven cloth of longitudinally strained reinforcing fibers.

Figure 13:
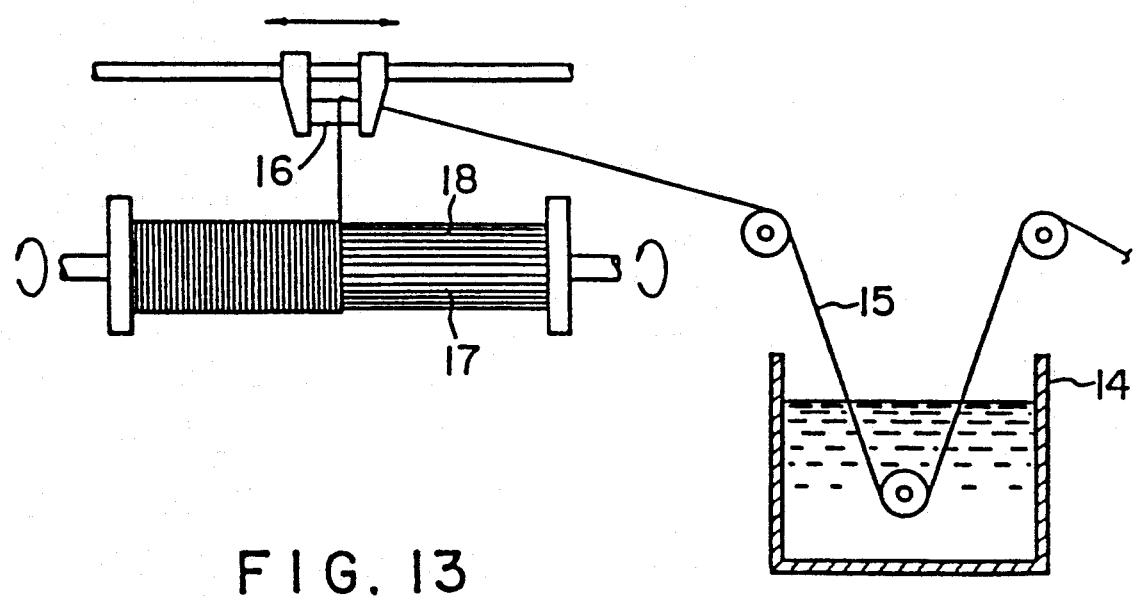
FIG. 13 is a schematic diagram showing a example of a method for forming a vortex shape in the case of using filament.
Figure 14:
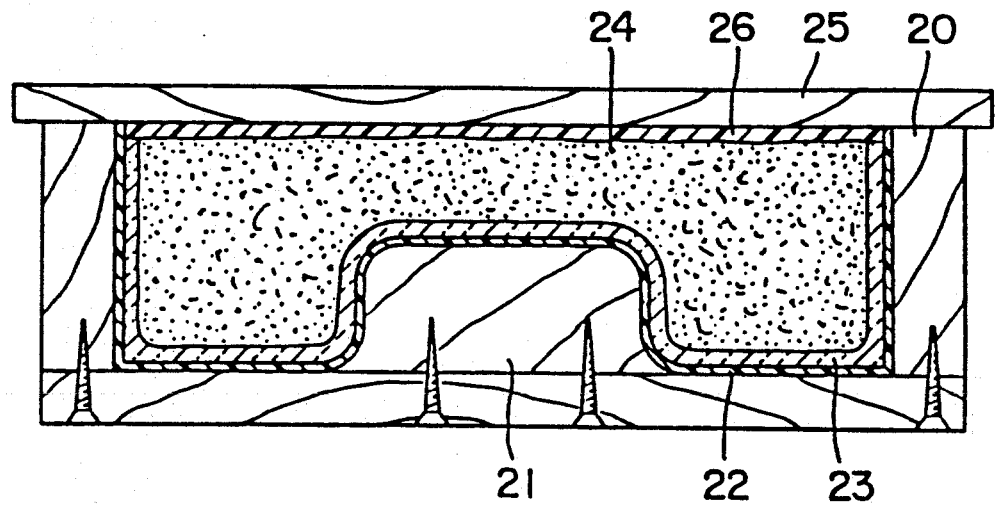
FIGS. 14 and 15 are vertical sectional views showing conventional examples.
Figure 15:
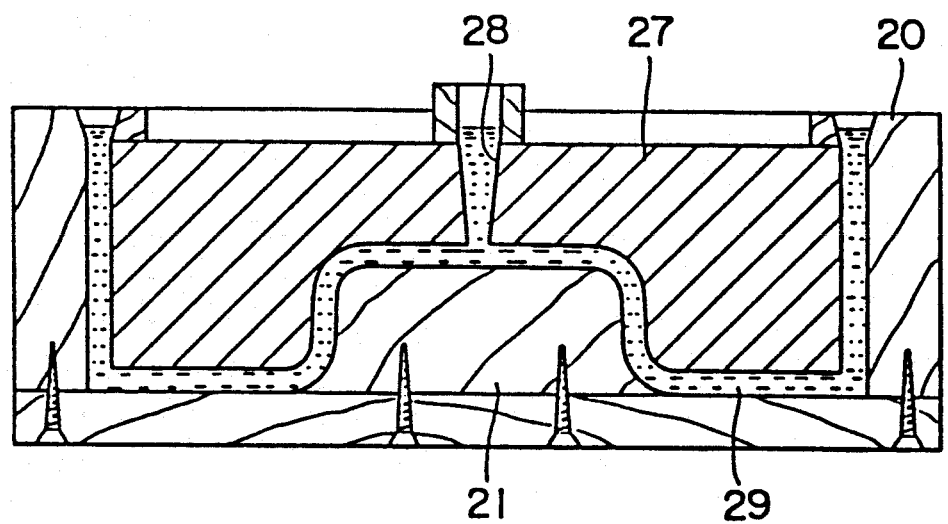

Further, in the case of using a reinforcing filament, the filament may be wound as shown in FIG. 13 for example. More specifically, a filament 15 which has passed through a resin vessel 14 is wound round a mandrel 17 while being guided right and left by means of a guide roller 16. Then, on the outer periphery of the filament winding around the mandrel 17 there are strained wefts 18 manually for example in the axial direction of the mandrel 17, followed by winding in the circumferential direction of the mandrel 17. After winding a required number of times, the winding obtained is taken out from the mandrel 17 and used.

INDUSTRIAL UTILIZABILITY

As set forth hereinabove, the sheet metal pressing resin die and the method for producing same according to the present invention are suitable for various pressing works, e.g. deep drawing, for metallic sheets.

What is claimed is:

1. A resin die for sheet metal pressing wherein a reinforcing member constituted by a thermosetting resin-impregnated cured product of a deformed wound multi-layer body formed of reinforcing fibers is formed at a die shoulder portion on which is exerted a local load.

2. A resin die for sheet metal pressing according to claim 1, wherein said deformed wound multi-layer body is formed by a woven cloth of reinforcing fibers.

3. A resin die for sheet metal pressing according to claim 1, wherein said deformed wound multi-layer body is formed by a non-woven cloth of reinforcing fibers.

4. A resin die for sheet metal pressing according to claim 1, wherein said deformed wound multi-layer body is formed by a reinforcing filament.

5. A resin die for sheet metal pressing according to any of claims 1 to 4, wherein not less than 50% of the reinforcing fibers of said deformed wound multi-layer body are arranged substantially in parallel with the direction of the load imposed on the die shoulder portion.

6. A resin die for sheet metal pressing according to any of claims 1 to 3, wherein said deformed wound multi-layer body is formed by one seamless sheet of cloth of reinforcing fibers.

7. A resin die for sheet metal pressing according to claims 1, wherein said reinforcing fibers are long fibers.

8. A resin die for sheet metal pressing according to any of claims 1 to 3, wherein said deformed wound multi-layer body is formed by lapping together plural sheets of cloth of reinforcing fibers so that the respective fibers are arranged in different directions and then winding the lapped sheets of the cloth in a deformed vortex shape.

9. A resin die for sheet metal pressing according to claim 2, wherein said woven cloth of reinforcing fibers is a mixed woven cloth of different kinds of reinforcing fibers.

10. A resin die for sheet metal pressing according to claim 3, wherein said non-woven cloth of reinforcing fibers is a mixed non-woven cloth of different kinds of reinforcing fibers.

11. A resin die for sheet metal pressing according to claim 4, wherein said reinforcing filament is a mixed filament consisting of different kinds of reinforcing filaments.

12. A resin die for sheet metal pressing according to claim 1, wherein said reinforcing fibers or filament is carbon, alumina, boron, silicon carbide, glass, aramid, ultra-high molecular weight polyethylene, vinylon, polyester, or stainless steel fibers or filament.

13. A resin die for sheet metal pressing according to claim 1, wherein the thermosetting resin of said thermosetting resin-impregnated cured product is a resin which is selected from the group consisting of a resin which is liquid at room temperature, a resin which is liquefied by heating to a temperature not higher than 100° C., a resin which permits the removal of a solvent and any combination thereof.

14. A resin die for sheet metal pressing wherein a reinforcing member constituted by a thermosetting resin-impregnated cured product of a deformed wound multi-layer body formed of reinforcing fibers is formed at a die shoulder portion on which is exerted a local load, and a surface resin layer is formed outside said reinforcing member.

15. A resin die for sheet metal pressing wherein a reinforcing member constituted by a thermosetting resin-impregnated cured product of a deformed wound multi-layer body formed of reinforcing fibers is formed at a die shoulder portion on which is exerted a load, and outside said reinforcing member there is formed a knitted cloth layer constituted by a thermosetting resin-impregnated cured product of a knitted cloth of reinforcing fibers of which the fibers positioned at least at the shoulder portion(s) are in stretched state, said knitted layer having a shape which follows the surface shape of the die.

16. A resin die for sheet metal pressing according to claim 15, wherein the reinforcing fibers used in said knitted cloth layer are reinforcing fibers having abrasion resistance and are either carbon, aramid, ultra-high molecular weight polyethylene, titanic acid, vinylon, polyester, or nylon fibers.

17. A resin die for sheet metal pressing according to claim 15, wherein the thermosetting resin use in said knitted cloth layer is a resin which is selected from the group consisting of a resin which is liquid at room temperature, a resin which is liquefied by heating at a temperature not higher than 100° C., a resin which permits the removal of a solvent, and any combination thereof.

18. A method for producing a sheet metal pressing resin die, which method comprises pushing a vortex winding of reinforcing fibers impregnated with a thermosetting resin toward a position corresponding to a die shoulder portion, thereby deforming said vortex winding, and allowing the resin to be cured to form a reinforcing member at a die shoulder portion on which is imposed a local load, said reinforcing member being constituted by a thermosetting resin-impregnated cured product of a deformed wound multi-layer body formed of reinforcing fibers.

* * * * *

UNITED STATES PATENT AND TRADEMARK OFFICE
CERTIFICATE OF CORRECTION

PATENT NO. : 5,081,861
DATED     : January 21, 1992
INVENTOR(S) : Hiroshi Miura

It is certified that error appears in the above-identified patent and that said Letters Patent is hereby corrected as shown below:

Column 8, line 4, after "force." begin a new paragraph;
         line 19, after "previously." begin a new paragraph.

Column 13, line 63, "claims" should be --claim--.

Signed and Sealed this

Twelfth Day of October, 1993

Attest:

BRUCE LEHMAN

*Attesting Officer*           *Commissioner of Patents and Trademarks*

BEST AVAILABLE COPY

UNITED STATES PATENT AND TRADEMARK OFFICE
CERTIFICATE OF CORRECTION

PATENT NO. : 5,081,861
DATED : January 21, 1992
INVENTOR(S) : Hiroshi Miura

It is certified that error appears in the above-identified patent and that said Letters Patent is hereby corrected as shown below:

Column 8, line 4, after "force." begin a new paragraph;

line 19, after "previously." begin a new paragraph.

Column 13, line 63, "claims" should be --claim--.

Signed and Sealed this

Sixteenth Day of November, 1993

Attest:

BRUCE LEHMAN

*Attesting Officer*  *Commissioner of Patents and Trademarks*